(12) United States Patent
Monette et al.

(10) Patent No.: US 6,339,973 B1
(45) Date of Patent: Jan. 22, 2002

(54) SLAVE VALVE WITH INTEGRAL SYNCHO-SAVER LOGIC

(75) Inventors: Daniel A. Monette; Patrick L. Brown, both of Battle Creek, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/546,447

(22) Filed: Apr. 10, 2000

(51) Int. Cl.[7] ................................. F16H 3/02
(52) U.S. Cl. ........................................... 74/745
(58) Field of Search ................................ 74/745

(56) References Cited

U.S. PATENT DOCUMENTS

| | | |
|---|---|---|
| 4,928,544 A | 5/1990 | Markyvech et al. |
| 4,944,197 A | 7/1990 | Stine et al. |
| 4,964,313 A | 10/1990 | Davis |
| 4,974,474 A | 12/1990 | Newbigging |
| 5,172,604 A * | 12/1992 | Monette et al. ............. 74/745 |
| 5,193,410 A | 3/1993 | Stine et al. |
| 5,199,312 A | 4/1993 | Huggins et al. |
| 5,899,121 A * | 5/1999 | Mulvihill et al. ............. 74/745 |

* cited by examiner

*Primary Examiner*—Dirk Wright
(74) *Attorney, Agent, or Firm*—Rader, Fishman & Grauer PLLC

(57) ABSTRACT

A pneumatic control system for a range type compound transmission is provided including a first actuator valve that selectively connects a first range cylinder chamber to a pneumatic source when a high range shift is requested by the vehicle operator, and a second valve that selectively connects a second range cylinder chamber to a pneumatic source when the main transmission is in gear, but exhausts the second chamber when the main transmission section is in neutral.

19 Claims, 5 Drawing Sheets

SLAVE VALVE WITH INTEGRAL SYNCHO-SAVER LOGIC

FIELD OF THE INVENTION

The present invention relates to a pneumatic, e.g. pressurized air operated, control system for shifting the auxiliary section of a compound transmission. In particular, the present invention relates to an improved pneumatic control and interlock system for a range type compound transmission.

BACKGROUND OF THE INVENTION

Compound transmissions of the range or combined range/splitter type are well known in the prior art. Such transmissions typically comprise a multiple speed main transmission section connected in series with a range type auxiliary section wherein the range step is greater than the total ratio coverage of the main transmission section.

In such transmissions, the main section is typically shifted by means of a shift bar housing assembly controlled by a manually operated shift lever or the like. In contrast, the auxiliary range section is shifted by means of a button or switch, usually manually operated, that controls a remote slave valve/actuator mechanism. The valve/actuator mechanism usually controls operation of a range selection cylinder. The range selection cylinder includes a fluid-actuated piston that divides the cylinder into a low-range and a high-range chamber. The piston is made to move in response to selective pressurization of one chamber while simultaneously exhausting a second chamber. Since the range section often utilizes synchronized jaw clutches a range shift should be initiated and completed while the main transmission section is in neutral, to provide acceptable shift quality and to prevent undue wear and/or damage to the synchronized jaw clutches.

Prior art compound range type transmissions usually include a control system, which is usually a pneumatic control system having interlock devices, that allows a range shift to be preselected using a selector button or switch at a master control valve. To prevent damage to the jaw clutches, the control system prevents shift initiation until the main transmission section is shifted to, or at least towards, the neutral condition. One method for preventing shift initiation utilizes mechanical type interlock devices on the range section actuator mechanical linkage that physically prevent movement of the range section shift fork until the main section is shifted into neutral. A second, more common method of preventing shift initiation utilizes logic-based interlock devices of the type wherein the valve supplying pressurized fluid to the range section cylinder is either disabled or not provided with pressurized fluid until a shift to main section neutral is sensed, or is only activated and provided with pressurized fluid while the main section is shifted to and remains in neutral. Examples of such transmissions and the control systems therefor may be seen by reference to U.S. Pat. Nos. 2,654,268; 3,138,965; 4,060,005 and 4,974,474,the disclosures of which are hereby incorporated by reference.

In general, prior art pneumatic control systems bias the range section piston toward the low range position until a high range shift is requested, thereby preventing the situation where the vehicle operator starts while in high range. Then, when a high range shift is requested, the range section piston is biased to the high range selection position. When biased towards high range, the high range chamber of the range section piston is typically pressurized with compressed air to approximately 60 to 80 psi, while the low range chamber is exhausted. In those systems where the range section piston is not provided with compressed fluid until a shift to main section neutral, problems may occur wherein the vehicle operator completes a main section shift, including a traverse through main section neutral, before the high range chamber of the range section cylinder is able to pressurize and complete the range section shift from low to high range. In this situation, even though the range shift has not completed, the high range chamber of the range section piston remains pressurized, exerting high stress against the mechanical interlocks and exerting a significant force on the synchronizer and clutch jaws. Excessive force may lead to adverse consequences such as severe range section shifting, re-engagement of the main transmission section prior to completion of the range section shift, damage to the range section synchronizers (especially during an upshift) or stranding the range section in a disengaged condition. Additionally, when the range section is finally shifted into high range, prior art logic systems continue to pressurize only the range cylinder high range chamber while leaving the low range chamber exhausted, such that the range section piston continuously exerts a shifting force even after the shift to high range is completed and the main transmission is in gear. Such a continuous force may affect reliability of the range section transmission over the life of the vehicle.

Therefore, a new logic system is needed to reduce the force exerted by the range section piston when a high range shift is requested by the vehicle operator, but is blocked because the main transmission section is in gear, and when a high range shift is accomplished and the new transmission section is in gear.

SUMMARY OF THE INVENTION

The above disadvantages are minimized or overcome by utilizing a pneumatic control system including a first actuator valve that selectively connects a first range cylinder chamber to a pneumatic source when a high range shift is requested by the vehicle operator, and a second valve that selectively connects a second range cylinder chamber to a pneumatic source when the main transmission is in gear, but exhausts the second chamber when the main transmission section is in neutral. Preferably, both the first and second valves are housed within the same valve body.

According to the present invention, the second valve is a two part, two-position valve movable by means of a spring-biased plunger. The plunger is positioned within the transmission to interact with a pin the moves in response to shifting of the main transmission into gear or into neutral. In the preferred embodiment, the plunger interacts with a neutral indicating device on the pin to force the second valve between an engaged and a disengaged position. In the engaged position, the second valve connects the second range cylinder chamber to a pneumatic source. In the disengaged position, the second valve exhausts the second range cylinder chamber. To accomplish movement between engaged and disengaged positions, the pin includes a circumferential notch indicative of the main transmission section neutral position. When a detent on the plunger senses the notch, the spring-biased plunger moves into the notch, thereby moving the second valve from the engaged to the disengaged position. However, when the detent is not within the notch, the second valve is forced into the engaged position.

Thus, upon sensing that the main transmission section has moved from an in gear position to a neutral position, the second chamber is exhausted while the first chamber remains pressurized, thereby allowing the range actuator piston to move to a preselected position. Once in gear, however, the control system equalizes the pressures between the two chambers.

Therefore, in the situation where the main transmission section is in gear but the auxiliary transmission section has not completed a range shift, force exerted by the range actuator piston is substantially eliminated until the main transmission shifts back towards neutral. Also, since compressed air is already behind the actuator piston (i.e. the first chamber is pressurized) when the main transmission section moves into neutral, a very fast range change is achieved once the second chamber is exhausted. However, since the second chamber was pressurized, exhausting the second chamber prevents too harsh of a shift that could result in a range section synchronizer malfunctioning.

Moreover, once the range actuator piston reaches the preselected position and the main transmission is moved once again into gear, the second valve pressurizes the second cylinder chamber, thereby reducing the force continuously exerted by the range actuator piston when in gear and in high range, thereby improving reliability and decreasing wear over the life of the vehicle.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
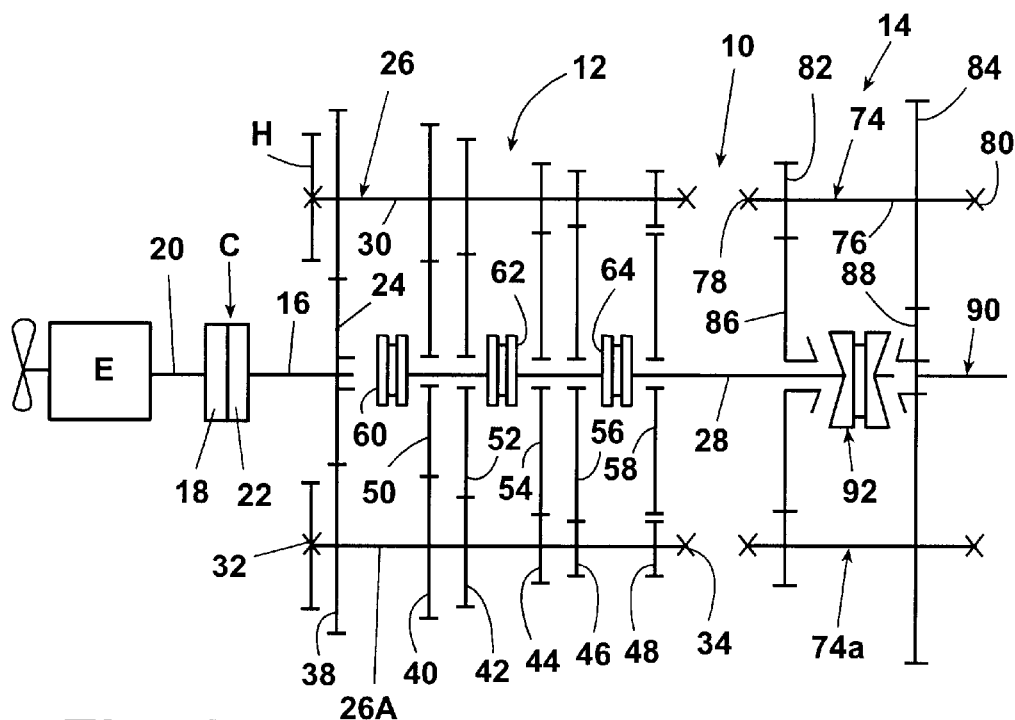
FIG. 1 is a schematic illustration of a compound transmission having a range type auxiliary section and utilizing the pneumatic control system of the present invention.
Figure 1A:
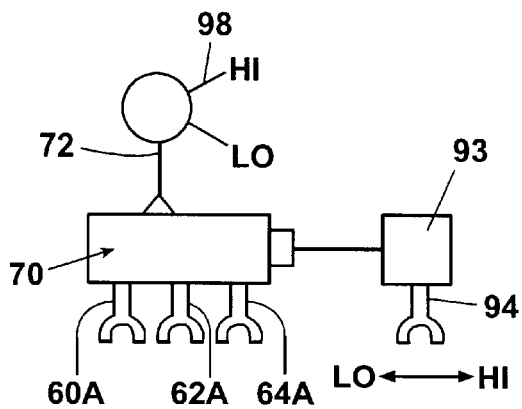
FIG. 1A is a schematic illustration of the shifting mechanism of the transmission of FIG. 1.
Figure 1B:
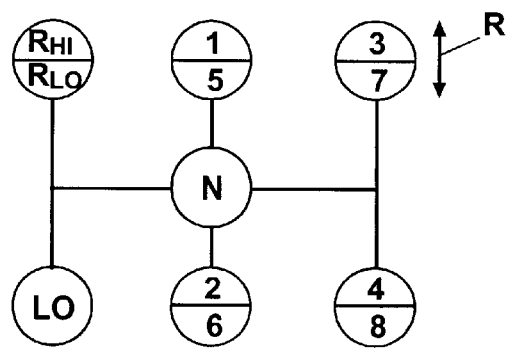
FIG. 1B is a schematic illustration of the shift pattern of the transmission of FIG. 1.

Referring to FIGS. 1, 1A and 1B, a range type compound transmission 10 is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64, as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks 60A, 62A and 64A, respectively, associated with the shift housing assembly 70, as is well known in the prior art. Clutch collars 60, 62 and 64 may be of the well known acting synchronized or nonsynchronized double acting jaw clutch type.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and, is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Clutch collars 60, 62, and 64 are three-position clutches in that they may be positioned in the centered, nonengaged position as illustrated, or in a fully rightwardly engaged or fully leftwardly engaged position by means of a shift lever 72. As is well known, only one of the clutch collars 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88 which is fixed to transmission output shaft 90.

A two-position synchronized jaw clutch assembly 92, which is axially positioned by means of shift fork 94 and the range section shifting actuator assembly 96, is provided for clutching either gear 86 to mainshaft 28 for low range operation or gear 88 to mainshaft 28 for direct or high range operation of the compound transmission 10. The shift pattern for compound range type transmission 10 is schematically illustrated in FIG. 1B. Selection of low or high range operation of the transmission 10 is by means of an operator actuated switch or button 98 which is usually located at the shift lever 72 (see FIG. 1A).

Although the range type auxiliary section 14 is illustrated as a two-speed section utilizing spur or helical type gearing, it is understood that the present invention is also applicable to range type transmissions utilizing combined splitter/range type auxiliary sections, having three or more selectable range ratios and/or utilizing planetary type gearing. Also, as indicated above, any one or more of clutches 60, 62 or 64 may be of the synchronized jaw clutch type and transmission sections 12 and/or 14 may be of the single countershaft type.

As noted above in the Background of the Invention, certain situations may arise where the vehicle operator requests a shift to high range in the auxiliary transmission, but completes a shift of the main transmission before the auxiliary transmission completes its shift to high range. Such a situation may lead to the range piston exerting high force against the mechanical interlocks and exerting a significant force on the synchronizer and clutch jaws. The problems of the prior art pneumatic air control system for a range type compound transmission in high range, such as transmission 10 illustrated above, may be appreciated with reference to FIGS. 2 and 2A.

Figure 2:
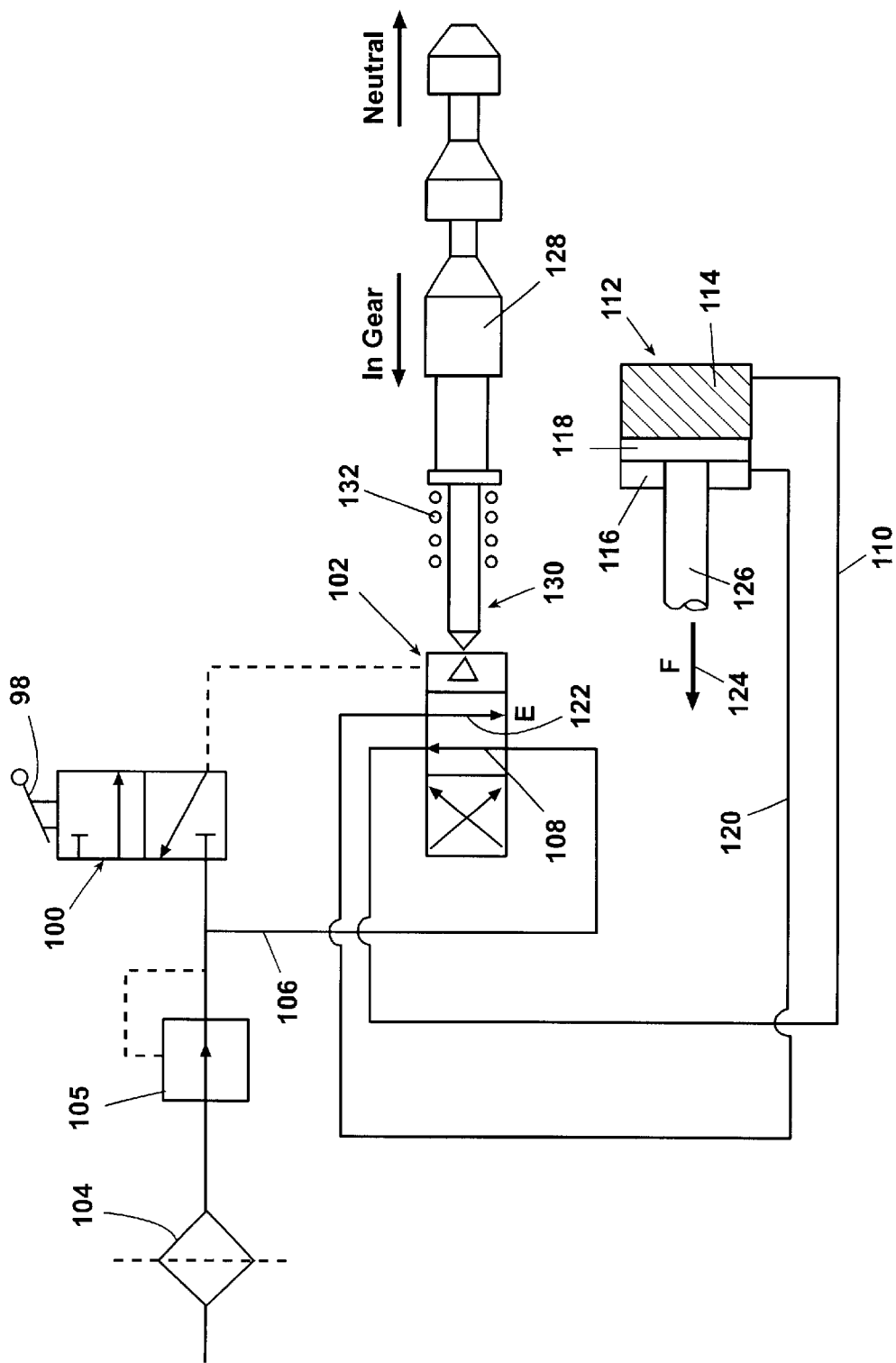
FIG. 2 is a block schematic diagram of a prior art pneumatic control system showing the main transmission section in neutral and the auxiliary transmission section in high range.

Specifically, FIG. 2 shows a prior art pneumatic control system in neutral where the vehicle operator has requested a shift to high range. The range shift selector switch 98, which is typically located in the driver's cab and preferably at the knob portion of the transmission shift lever 72 (see FIG. 1A), operates a two-way, two-position master valve 100 which is usually also located in the knob of shift lever 72. The master control valve 100 controls a slave or piloted actuator control valve 102 that can handle relatively large air flows. When the vehicle operator actuates selector switch 98 to position master valve 100 in its upward position as shown in FIG. 2, air pressure supplied from an air supply 104 through a filter/regulator 105 is applied through a small conduit 106 to a high range internal path 108 in valve 102. Since the present invention applies only to the high range setting of the auxiliary transmission, air flow through conduit 106 defaults through high range internal path 108.

As seen in FIG. 2, range piston cylinder 112 includes a right or high range side 114 and a left or low range side 116 separated by a range piston 118, which is sealingly and slideably received within cylinder 112. After passing through high range internal path 108, air is allowed to flow through relatively large diameter low resistance fluid conduits 110 that fluidly communicate with the high range side 114 of the range piston cylinder 112. Simultaneously, low range side 116 is fluidly connected through relatively large diameter low resistant fluid conduit 120 back to flow path 122 in valve 102 that is further fluidly connected to an exhaust E. As a result, once selector switch 98 is placed into the high range position, the high range side 114 of cylinder 112 is pressurized while the low range side 116 is exhausted, causing piston 118 to move leftwardly, thereby exerting a force F in the direction of arrow 124 on piston 118 and on range actuator shaft 126, which is connected to piston 118. (For purposes of this description, terms such as "leftwardly" designate directions in the drawings only, and may not accurately represent directions within the actual vehicle.) As piston 118 moves, actuator shaft 126 is urged leftwardly, to a high range position, causing a corresponding gear shift within the auxiliary transmission. Additionally, force F continues to be exerted even after piston 118 has moved sufficiently to shift the auxiliary transmission into high range, even when the main transmission is in gear.

Slave valve 102 also interacts with "Christmas tree" 128 through pin 130 biased by spring 132. In particular, fore and aft movement of tree 128 and pin 130 coincides with fore and aft movement of the shift rails (not shown). Therefore, in FIGS. 2–4, the position of tree 128 is indicative of the main transmission condition i.e. (in-gear or neutral).

Figure 2A:
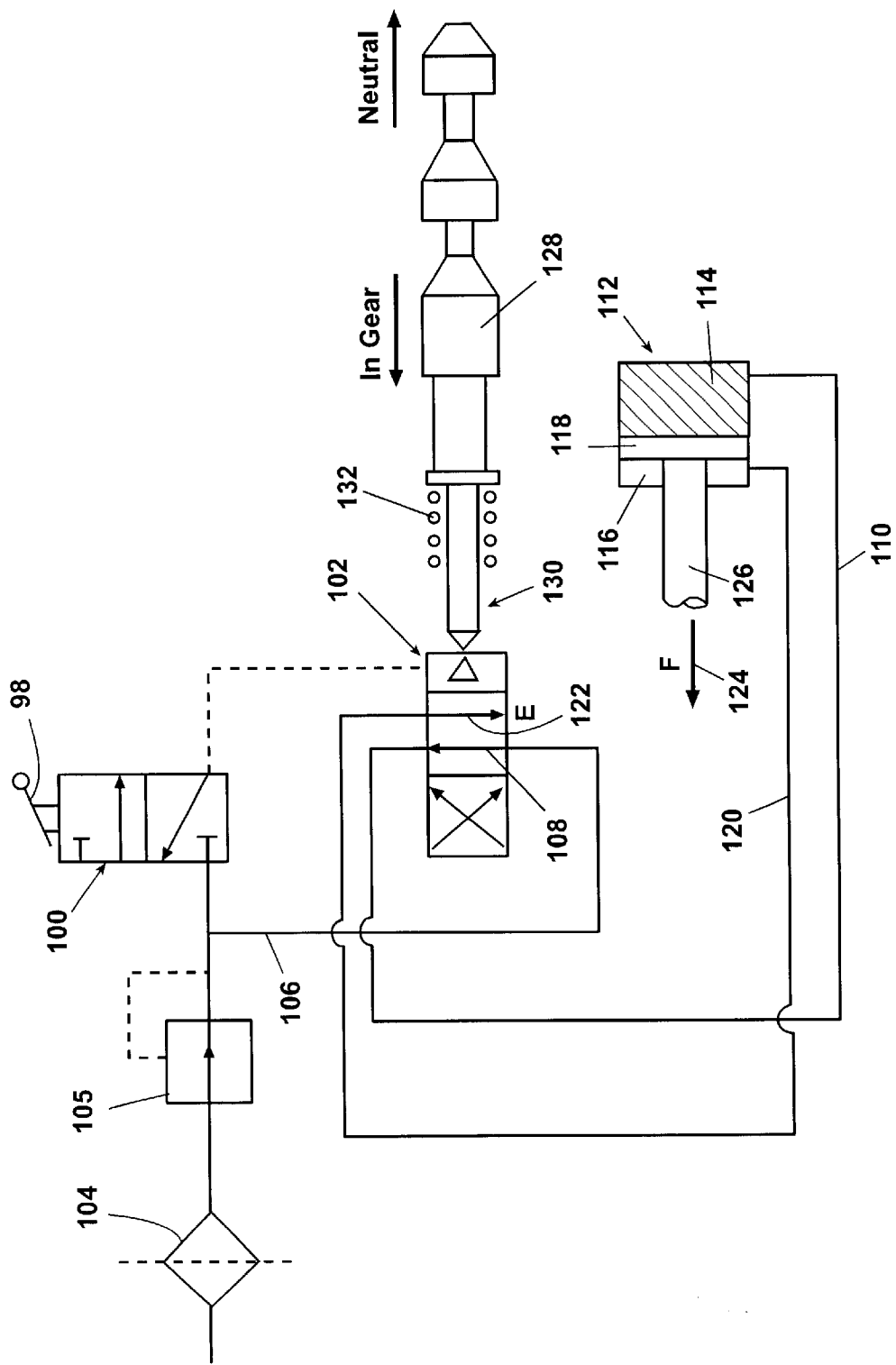
FIG. 2A is a block schematic diagram of a prior art pneumatic control system showing the main transmission section in gear and the auxiliary transmission section in high range.

As seen when comparing the outcome in FIGS. 2 and 2A, the prior art control system causes cylinder 112 to behave identically in high range whether the main transmission is in gear or is shifted to neutral. Even though tree 128 has moved rightwardly in FIG. 2A to an in-gear position, the pneumatic control system is unchanged. Thus, high range side 114 of cylinder 112 is pressurized while low range side 116 is exhausted, and force F continues to be exerted in the direction of arrow 124, even though the main transmission is in gear. In situations where the operator completes a shift of the main transmission before the piston 118 is able to complete the range shift, the force F exerted by cylinder 112 may exert adverse forces on the synchronizer and clutch jaws, as well as against any mechanical interlocks. Likewise, even if the range section completes a range shift, the force F is not diminished when the main transmission is placed in gear, which may adversely reduce transmission life.

Figure 3:
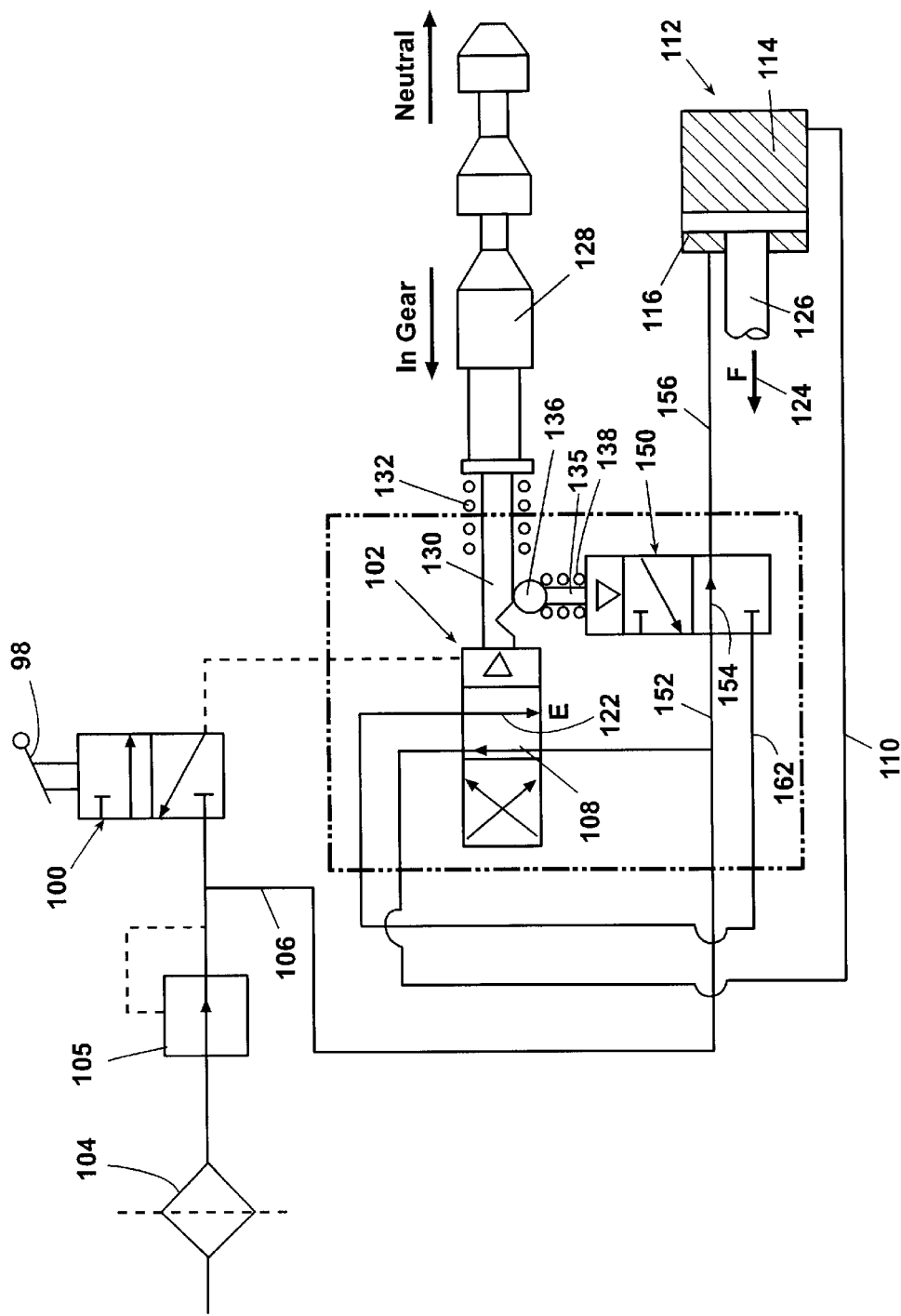
FIG. 3 is a block schematic diagram of a pneumatic control system according to the present invention, showing the main transmission section in gear and the auxiliary section in high range.

As illustrated in FIG. 3, to minimize the force F exerted when the main transmission is in gear or where the range shift has completed, the present invention replaces a portion of conduit 120 and adds a second two-position slave valve 150 between cylinder low range side 116 and the exhaust while extending the connection to conduit 106. In practice, valve 150 may be combined with valve 102 within the same valve body. However, for purposes of the following description, the valves 102 and 150 will be depicted and described as being separate valves. Valve 150 is adapted to move from an engaged position, where it rests in response to sensing that the main transmission is in gear (i.e. a non-neutral position), to a disengaged position in response to sensing that the main transmission is in neutral. Preferably valve 150 senses the main transmission status (i.e. neutral or non-neutral) by means of a plunger 135 attached to valve 150 that interacts with pin 130 and tree 128. Plunger 135 includes a detent 136 at an outer free end. A spring 136 is disposed about plunger 135 between detent 136 and valve 150 to bias detent 136 toward pin 130. Additionally, pin 130 on christmas tree 128 now includes an indicating slot 134 sized to receive detent 136. As shown in FIG. 3, when the main transmission is in gear, pin 130 moves leftwardly such that slot 134 disengages detent 136 on plunger 135, thereby compressing spring 138 and forcing valve 150 to the engaged position. When the transmission is in neutral, tree 128 moves rightwardly thereby causing slot 134 to engage detent 136 and allowing valve 150 to move to the disengaged position (see FIG. 4). In the figures, detent 136 is shown as spherical and slot 134 is shown as triangular in cross-section. However, the relative shapes of both slot 134 and detent 136 may be adjusted as required to permit adequate movement of plunger 135. Additionally, slot 134 is preferably provided about the entire circumference of pin 132.

FIG. 3 shows the new control system in high range and in gear, such that valve 150 is moved to the engaged or "in gear" position. In this configuration, when switch 98 is actuated to position master valve 100 in its upward position (thereby requesting a high range shift), air pressure from air supply 104 is applied through conduit 106 to a high range internal path 108 in valve 102. From path 108, air is supplied through large diameter low resistance fluid conduit 110 to the high range side 114 of cylinder 112. Additionally, air is supplied through conduit extension 152 through an engaged position internal flow path 154 in valve 150 to a large diameter low resistance fluid conduit 156 that fluidly communicate with the low range side 116 of cylinder 112. Thus, when in gear and in high range, the valves 102 and 150 provide fluid pressure to both left and right sides 114, 116 of cylinder 112, thereby substantially eliminating any force F in the direction of arrow 124.

Figure 4:
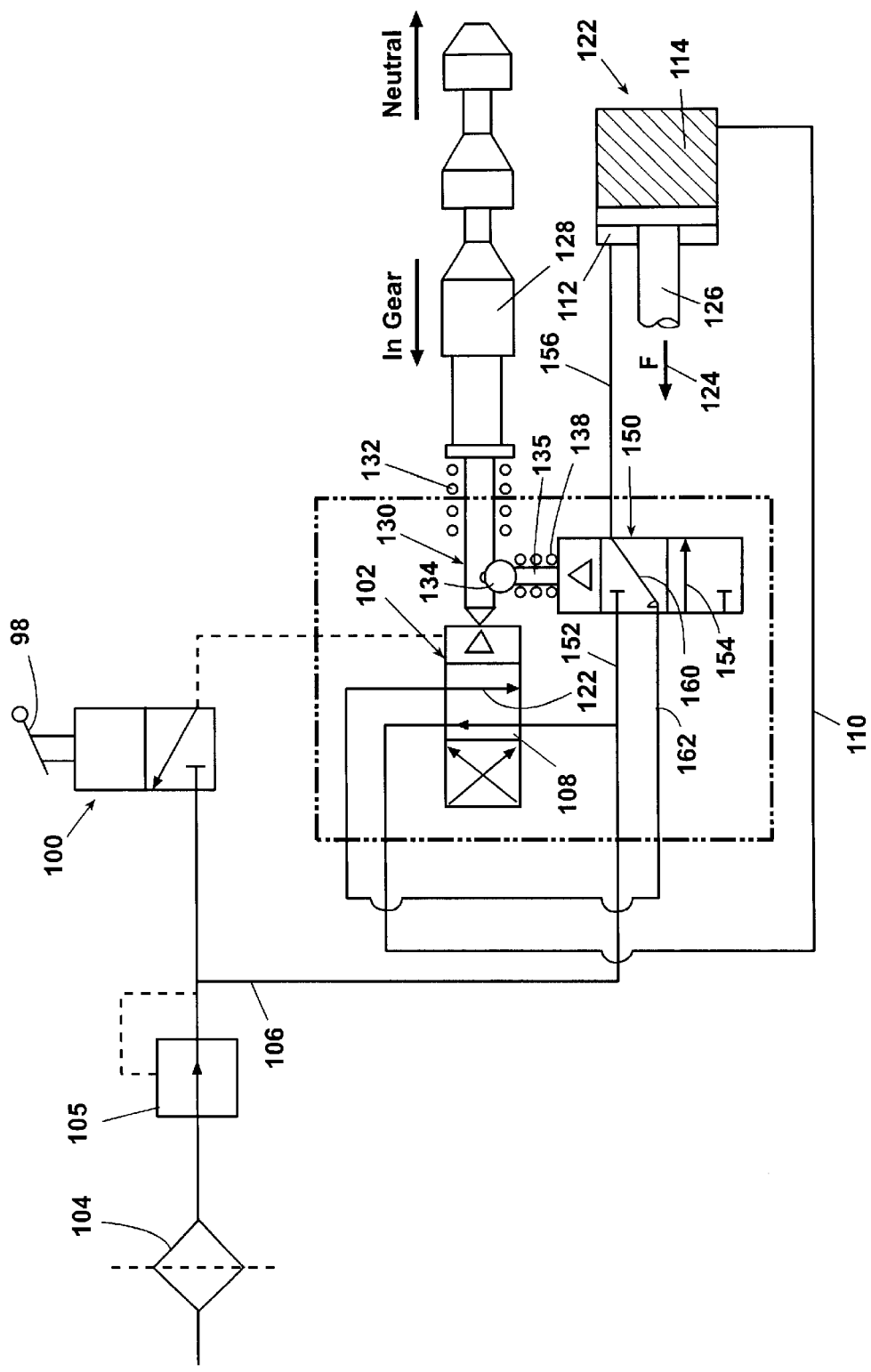
FIG. 4 is a block schematic diagram of a pneumatic control system according to the present invention, showing the main transmission section in neutral and the auxiliary section in high range.

However, it is still desirable that force F be applied when the main transmission is in neutral to ensure that a range shift completes and to maintain the auxiliary transmission in the upper range. As seen in FIG. 4, when the main transmission moves to neutral, tree 128 moves rightwardly, allowing pin 130 to move so that slot 134 engages detent 136, moving plunger 135 upwardly and causing valve 150 to move to a disengaged or "neutral" position. In so moving, conduit extension 152 is closed off at tree 128 within valve 150. Instead, conduit 156 fluidly communicates through internal flow path 160 to connect with large diameter low resistance fluid conduit 162, which is in fluid communication with exhaust flow path 122 within slave valve 102. As a result, when the valve 150 moves to the disengaged position in response to movement of tree 128 towards neutral, left side 114 of cylinder 112 is vented while right side 116 remains charged with high pressure air. Force F is therefore maximized in the direction of arrow 124 whenever the main transmission is shifted toward or into neutral. It should be noted that the structure of flow path 154 within valve 150 may be adjusted to affect the force F exerted by shaft 126. Additionally, the control system of the present invention may be modified to adjust the amount of movement of piston 118 in response to switch 98, thereby adapting the invention for use in range/splitter transmissions and in those transmissions having greater than two auxiliary gears.

Thus, the present invention is directed to minimizing the force F exerted against the mechanical interlocks and on the synchronizer and clutch jaws when the main transmission is in gear in high range. The two-position valve 150 provides communication to the low range side 116 of cylinder 112 with high pressure fluid when the transmission is in gear, but exhausts the left side when the main transmission is shifted to neutral. The control system is therefore advantageous in situations where a range shift from low to high range is requested but the main transmission is shifted before the range shift is completed. In this situation, the force exerted to fully accomplish a range shift is greatly minimized when the main transmission is in gear, but is immediately reapplied when the main transmission moves toward or into neutral, thereby completing the high range shift while preventing a relatively harsh range section shift that would be objectionable to the vehicle operator and might also result in the crash-through or other improper operation of the range section synchronizer mechanism. Likewise, once the shift to high range is accomplished and the main transmission is placed back in gear, the force F is minimized due to pressure equalization between the two sides of cylinder 112, thereby increasing the life of the transmission components.

Preferred embodiments of the present invention have been disclosed. A person of ordinary skill in the art will realize, however, that certain modifications and alternative forms will come within the teachings of this invention. Therefore, the following claims should be studied to determine the true scope and content of the invention.

What is claimed is:

1. In a pressurized fluid operated control system for a compound transmission including a multiple speed main transmission section connected in series with a multiple speed auxiliary transmission section, an operator actuated selection device allowing selection of a plurality of main transmission section ratios or of a main transmission section neutral position and allowing preselection of an auxiliary transmission section ratio, an auxiliary shifting mechanism including a fluid actuated actuator piston slideably and sealingly received in an actuator cylinder defining a first and second cylinder chambers, shifting from one of the auxiliary section speed ratios to another of the auxiliary section speed ratios requiring simultaneous pressurization of one of the cylinder chambers and exhausting of the other of the cylinder chambers, a control system comprising:

an actuator control valve controlled by the operator actuated selection device adapted to connect the first cylinder chamber to a source of pressurized fluid in response to the selection device; and a second valve adapted to connect the second cylinder chamber to a source of pressurized air when the main transmission section is selectively moved to one of the plurality of main transmission section ratios, wherein said actuator control valve and said second valve are incorporated within a single valve body.

2. The control of claim 1, wherein said second valve further operates to connect a selected one of said cylinder chambers to an exhaust conduit when the main transmission section is selectively moved to the main transmission section neutral position.

3. A The control system of claim 1, wherein said second valve is a two part, two-position valve operable by a plunger interacting with a neutral indicating device capable of axial movement in response to movement of the operator actuated selection device to move said second valve between an engaged and a disengaged position.

4. The control system of claim 3, wherein said neutral indicating device includes an axially movable pin having a circumferential notch selectively located thereon indicative of the main transmission section neutral position.

5. The control system of claim 4, wherein said plunger moves said two-position valve to said disengaged position in response to interaction with said notch.

6. The control system of claim 1 wherein said auxiliary transmission section comprises a range type auxiliary transmission section.

7. The control system of claim 6 wherein said range type auxiliary transmission section is engageable by means of synchronized jaw clutch devices.

8. A The control system of claim 1 wherein said pressurized fluid comprises pressurized air.

9. In a pressurized fluid operated control system for a compound transmission including a multiple speed main transmission section connected in series with a multiple speed auxiliary transmission section, an operator actuated selection device allowing selection of a main transmission section ratio or a main transmission section neutral position and allowing preselection of an auxiliary transmission section ratio, an auxiliary shifting mechanism including a fluid actuated actuator piston slideably and sealingly received in an actuator cylinder defining first and second cylinder chambers, shifting from one of the auxiliary section speed ratios to another of the auxiliary section speed ratios requiring simultaneous pressurization of one of the cylinder chambers and exhausting of the other of the cylinder chambers, a control system comprising:

an actuator control valve controlled by the operator actuated selection device, said valve adapted to connect the first cylinder chamber to a source of pressurized fluid in response to the selection device; and a two-position valve in series with said control valve, said two-position valve capable of moving between an engaged position and a disengaged position, wherein said two-position valve operates to connect the second chamber to a source of pressurized air when in said engaged position, wherein said actuator control valve and said second two-position valve are incorporated within a single valve body.

10. The control system of claim 9, wherein said two-position valve further operates to connect a selected one of said cylinder chambers to an exhaust conduit when in said disengaged position.

11. The control system of claim 9, wherein said two-position valve moves to said engaged position in response to the main transmission shifting into a non-neutral position.

12. The control system of claim 11, wherein said two-position valve moves to said disengaged position in response to the main transmission shifting into or toward neutral.

13. The control system of claim 12, wherein said two-position valve is operable by a plunger interacting with a neutral indicating device capable of axial movement in response to movement of the operator actuated selection device.

14. The control system of claim 13, wherein said neutral indicating device includes an axially movable pin having a circumferential notch selectively located thereon indicative of the main transmission section neutral position, said plunger moving said two-position valve to said disengaged position in response to interaction with said notch.

15. A compound transmission comprising a multiple speed main transmission section connected in series with a multiple speed auxiliary transmission section in which compound shifts of both said main transmission section and said auxiliary transmission section are permitted;

an operator actuated selection device allowing selection of a plurality of main transmission section ratios or a main transmission section neutral position and allowing preselection of an auxiliary transmission section ratio;

an auxiliary shifting mechanism including a fluid actuated actuator piston slideably and sealingly received in an actuator cylinder defining first and second cylinder chambers, wherein shifts of said auxiliary transmission section are powered by a pneumatic source controlled by an actuator control valve effective to connect said first cylinder chamber to said pneumatic source; and a second valve effective to connect said second cylinder chamber to said pneumatic source when said main transmission is selectively moved to one of said plurality of main transmission section ratios, wherein said actuator control valve and said second valve are incorporated within a single valve body.

16. The transmission of claim 15, wherein said second valve is further effective to connect said second chamber to an exhaust conduit when said main transmission section is selectively moved to said main transmission section neutral position.

17. The transmission of claim 15, wherein said second valve is a two part, two-position valve operable by a plunger interacting with a neutral indicating device capable of axial movement in response to movement of the actuated selection device to move said second valve between an engaged and a disengaged position.

18. The transmission of claim 17, wherein said neutral indicating device includes an axially movable pin having a circumferential notch selectively located thereon indicative of the main transmission section neutral position.

19. The transmission of claim 18, wherein said plunger moves said two-position valve to said disengaged position in response to interaction with said notch.

* * * * *

UNITED STATES PATENT AND TRADEMARK OFFICE
CERTIFICATE OF CORRECTION

PATENT NO. : 6,339,973 B1
DATED : January 22, 2002
INVENTOR(S) : Daniel A. Monette and Patrick L. Brown It is certified that error appears in the above-identified patent and that said Letters Patent is hereby corrected as shown below:

<u>Title page, Item [54] and Column 1, line 1,</u>
Replace "SLAVE VALVE WITH INTEGRAL SYNCHO-" with -- SLAVE VALVE WITH INTEGRAL SYNCHRO- --.

<u>Column 8,</u>
Line 23, replace "The control of claim 1" with -- The control system of claim 1 --.
Line 28, replace "A The control system" with -- The control system --.
Line 47, replace "A The control system" with -- The control system --.

<u>Column 10,</u>
Line 27, replace "the actuated selection" with -- the operator actuated selection --.

Signed and Sealed this

Twenty-fifth Day of June, 2002

Attest:

Attesting Officer

JAMES E. ROGAN
*Director of the United States Patent and Trademark Office*